United States Patent
Stumm et al.

(10) Patent No.: US 11,861,363 B2
(45) Date of Patent: Jan. 2, 2024

(54) DEVELOPMENT LANDSCAPE BUILD SYSTEM

(71) Applicant: SAP SE, Walldorf (DE)

(72) Inventors: Joachim Stumm, Lobbach (DE); Ismail Koeken, Nussloch (DE)

(73) Assignee: SAP SE, Walldorf (DE)

(*) Notice: Subject to any disclaimer, the term of this patent is extended or adjusted under 35 U.S.C. 154(b) by 92 days.

(21) Appl. No.: 17/508,150

(22) Filed: Oct. 22, 2021

(65) Prior Publication Data

US 2023/0126059 A1 Apr. 27, 2023

(51) Int. Cl.
*G06F 9/44* (2018.01)
*G06F 8/77* (2018.01)
*G06F 8/10* (2018.01)
*G06F 8/61* (2018.01)

(52) U.S. Cl.
CPC .................. *G06F 8/77* (2013.01); *G06F 8/10* (2013.01); *G06F 8/61* (2013.01)

(58) Field of Classification Search
CPC .................. G06F 8/77; G06F 8/10; G06F 8/61
See application file for complete search history.

(56) References Cited

U.S. PATENT DOCUMENTS

| | | | | |
|---|---|---|---|---|
| 7,353,248 | B1* | 4/2008 | Kirkpatrick | H04L 67/56 709/200 |
| 2005/0021354 | A1* | 1/2005 | Brendle | G06F 9/547 717/100 |
| 2005/0066324 | A1* | 3/2005 | Delgado | G06F 8/61 717/170 |
| 2006/0218547 | A1* | 9/2006 | Purkeypile | G06F 8/61 717/173 |
| 2008/0098465 | A1* | 4/2008 | Ramakrishna | G06F 21/10 726/5 |
| 2008/0148412 | A1* | 6/2008 | Okada | G06F 21/12 726/28 |
| 2008/0244754 | A1* | 10/2008 | Curren | G06F 21/105 726/27 |
| 2009/0113382 | A1* | 4/2009 | Chancey | G06F 8/71 717/104 |
| 2017/0255762 | A1* | 9/2017 | Kosovan | H04L 63/12 |
| 2018/0210707 | A1* | 7/2018 | Stallmann | H04L 41/0893 |
| 2020/0409543 | A1* | 12/2020 | Imamura | G06F 9/451 |

* cited by examiner

*Primary Examiner* — Hang Pan
(74) *Attorney, Agent, or Firm* — SCHWEGMAN LUNDBERG & WOESSNER, P.A.

(57) ABSTRACT

Systems and methods are provided for executing a subset of a plurality of scripts based on traversing a decision and execution hierarchy using standard parameters and custom parameters to install and configure a new computing system for a given entity.

20 Claims, 13 Drawing Sheets

| TABLE: /DLMO/R3_RFC | | DATA BROWSER: TABLE /DLMO / R3_RFC SELECT ENTRIES 26 | | | | | |
|---|---|---|---|---|---|---|---|
| DISPLAYED FIELDS: 24 OF 28 | FIXED COLUMNS: | [1] LIST WIDTH 1023 | | | | | |
| ACTIVITY | RFCDEST | DESCRIPTION | RFCLB | SYSID | IPA_ONLY | HOST_ONLY | THOST |
| ATC_CONNECT_MASTER_SYSTEM | <SID>CLNT<CLIENT> | CONNECTION FROM TARGET SYSTEM TO ATC MASTER SYSTEM | X | <SID> | | X | |
| ATC_EXC_PUSH | <SID>CLNT<CLIENT> | PUSH ATC EXEMPTIONS FROM MASTER TO TARGET SYSTEM | X | <SID> | | X | |
| ATC_EXC_TAKEOVER | <SID>CLNT<CLIENT> | TAKE OVER ATC EXEMPTIONS FROM SOURCE SYSTEM | X | <SID> | | X | |
| ATC_FETCH_LOCAL_PRIOS | <SID>CLNT<CLIENT> | FETCH LOCAL ATC CHECK PRIORITIES FROM REFERENCE SYSTEM | X | <SID> | | X | |
| ATC_FETCH_SU22_DATA | <SID>CLNT<CLIENT> | FETCH SU22 TRACE SYSTEM | X | <SID> | | X | |
| ATC_MASTER | <SID>CLNT<CLIENT> | RFC FOR ATC MASTER SYSTEM | | <SID> | | X | |
| ATC_REPLICATE_RESULT | <SID>CLNT<CLIENT> | REPLICATION OF ATC RESULTS | | <SID> | | X | |
| BGRFC_SUPERVISOR | BGRFC_SUPERVISOR | BGRFC_SUPERVISOR | | | X | | |
| CLIENT_COPY | <SID>CLNT<CLIENT> | RFC FOR CLIENT COPY | X | <SID> | | | |
| DE_ANONYMIZATION | <SID>CLNT000 | RFC TO REFERENCE SID USED FOR DEANONYMIZATION | X | <SID> | X | | |
| DSS_IFP | DSS_IFP | RFC DSS_IFP | X | IFP | | | |
| FETCH_SOURCE_SYSTEM | SAPOSS | FIND THE SOURCE SYSTEM DETAILS | | | | | |
| FINRFC_CLIENTCOPY | FINBTR@<SID>CLNT<CLIENT> | GENERATED DESTINATION FOR TRANSPORT METHODS | X | <SID> | | X | |
| FINRFC_CLIENTCOPY_T | FINBTR@<SID>CLNT<CLIENT> | GENERATED DESTINATION FOR TRANSPORT METHODS | X | <SID> | | X | |
| FIORI_ALE_RFC | <SID>CLNT<CNT>_ALE | FIORI ALE CONNECTION | X | <SID> | | X | |
| FIORI_BACKEND_RFC | <SID>_TRUST | FIORI BACKEND CONNECTION | X | <SID> | | X | |
| FIORI_BGRFC | IWNGW_BGRFC | BGRFC FIORI | | | | | |
| FIORI_FRONTEND_RFC | <SID>_<CLIENT>_RFC | FIORI FRONTEND CONNECTION | X | <SID> | X | | |
| GTABKEY_SERVER | GTABKEY_SERVER | CENTRAL GTABKEY SERVER | X | GTS | | X | |
| GTADIR_SERVER | GTADIR_SERVER | CENTRAL GTADIR SERVER | X | GTS | | X | |
| GTADIR_SERVER_TEMP | GTADIR_SERVER_TEMP | TEMPORARY GTADIR_SERVER CONNECTION | | | | | |
| HOTPACKRUL | <SID>CLNT<CLIENT> | RFC FOR RETRIEVAL OF HOTPACKRUL ENTRIES | X | <SID> | | X | X |
| MDGRFC_CLIENTCOPY | MDGTR@<SID>CLNT<CLIENT> | GENERATED DESTINATION FOR TRANSPORT METHODS | X | <SID> | | X | |
| PQP_REGISTRATION | AOFRFC_PQP | PQP REGISTRATION | X | PQP | | X | |
| SAPOSS | SAPOSS | SAPOSS | X | I7P | | X | |
| SELF RFC | <SID>CLNT<CLIENT> | SELF RFC | | | | | |

FIG. 3

| TABLE / DLMO / R3_RFC DISPLAY | |
|---|---|
| ACTIVITY | HOTPACKRUL |
| RFCDEST | <SID>CLNT<CLIENT> |
| DESCRIPTION | RFC FOR RETRIEVAL OF HOTPACKRUL ENTRIES |
| RFCLB | X |
| SYSID | <SID> |
| IPADDRESS ONLY | |
| HOST ONLY | X |
| THOST | |
| IPADDRESS | |
| SYSNR | |
| LOGONGROUP | PUBLIC |
| LANG | EN |
| CLIENT | <CLIENT> |
| USERNAME | ALEREMOTE |
| PASSWORD | $<ALEREMOTE_0000020481> |
| CUSER | |
| TRUST | |
| RFCVER | 0 |
| GWHOST | |
| GWSERV | |
| SNC INACTIVE | X |
| SNC ACTIVE | |
| UNICODE | X |
| NONUNI | |
| CODEPAGE | X |
| CODELANG | |
| EXP CODE | |
| MDMPACT | |

```
{
    "DATASET" : {
        "CT_ACTIVITY" : "HOTPACKRUL",
        "CT_RFCDEST" : "OASCLNT000",
        "CT_DESCRIPTION" : "RFC FOR RETRIEVAL OF HOTPACKRUL ENTRIES",
        "CT_RFCLB" : "X",
        "CT_SYSID" : "OAS",
        "CT_IPADDRESS_ONLY" : " ",
        "CT_HOST_ONLY" : "X",
        "CT_THOST" : "IDCSOAS.WDF.SAP.CORP",
        "CT_IPADDRESS" : " ",
        "CT_SYSNR" : "00",
        "CT_LOGONGROUP" : "PUBLIC",
        "CT_LANG" : "EN",
        "CT_CLIENT" : "000",
        "CT_USERNAME" : "ALEREMOTE",
        "CT_PASSWORD" : "$<ALEREMOTE_0000020481>",
        "CT_CUSER" : " ",
        "CT_TRUST" : " ",
        "CT_RFCVER" : "0",
        "CT_GWHOST" : " ",
        "CT_GWSERV" : " ",
        "CT_SNC_INACTIVE" : "X",
        "CT_SNC_ACTIVE" : " ",
        "CT_UNICODE" : "X",
        "CT_NONUNI" : " ",
        "CT_CODEPAGE" : "X",
        "CT_EXP_CODE" : " ",
        "CT_MDMPACT" : " ",
    }
}
```

DEVELOPMENT LANDSCAPE BUILD SYSTEM

BACKGROUND

Business entities have very specific requirements for a computing system to run their business. For example, a banking entity may have a specific set of requirements for a computing system to run a banking business that is different from a retail entity running a retail business. These requirements can consist in everything from a product type (e.g., customer relationship management, enterprise resource planning), a public cloud (e.g., Amazon Web Services, Google Cloud Platform), a database type, an installation type, system roles, service levels, network releases, a client type, a system type, and so forth.

BRIEF DESCRIPTION OF THE DRAWINGS

Various ones of the appended drawings merely illustrate example embodiments of the present disclosure and should not be considered as limiting its scope.

FIG. 3 illustrates an example customizing table, according to some example embodiments.

FIG. 4 illustrates an example entry of a customizing table, according to some example embodiments.

FIG. 5 illustrates example output as a JSON output upon receiving values from a customizing table entry, according to some example embodiments.

DETAILED DESCRIPTION

Figure 11:
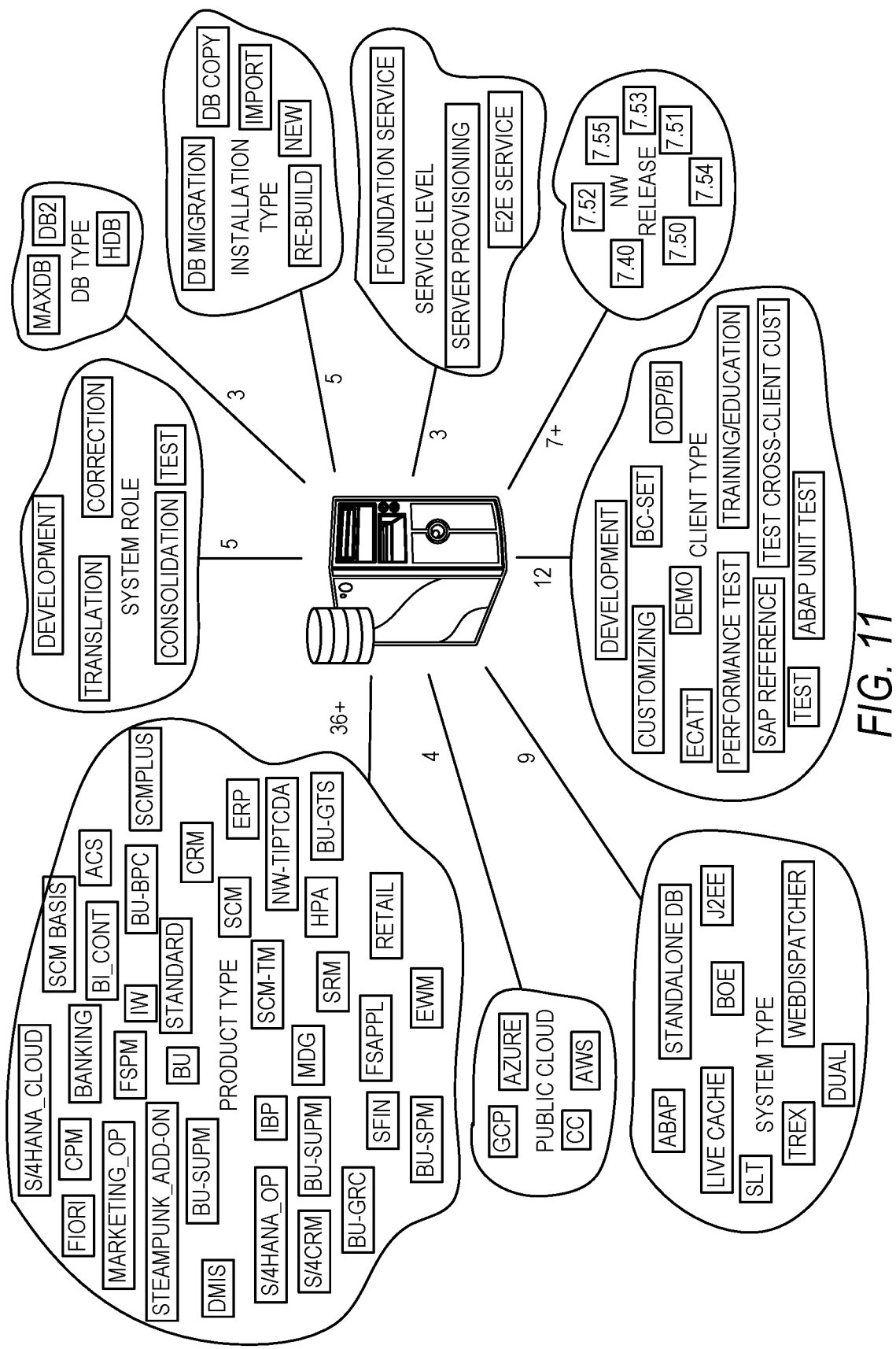
FIG. 11 illustrates an example of some of the different system attributes that can be needed for a computing system, according to some example embodiments.

Systems and methods described herein relate to a development landscape build system used to build new computing systems, such as a development or maintenance computing system used to do development and maintenance of a product, a test system to test to confirm the developed product works as it should, a consolidation system to ensure that the product complies to quality standards, among other types of computing systems. As explained above, there are many specific requirements for a computing system for each particular entity or business. FIG. 11 shows an example of some of the different requirements that can be needed for any computing system. Even when considering only these most basic attributes or characteristics of a system, there are thousands of possible permutations. In FIG. 11, the characteristics reach some 24+ million permutations, and given that a system has many hundreds of other specific characteristics of a particular entity and landscape, simple multiplication yields an almost infinite number of theoretically possible permutations. Thus, to build such custom systems in a timely manner and at any reasonable scale is incredibly challenging and limited to what is manually possible.

One option for building such systems for various entities is to build only standard computing systems. For example, a template that includes a number of standard components (e.g., one type of cloud, one type of operating system, one database type) can be created that can then be copied to build each new system. Since each system is the same, it is an easier and faster process to build a new system for an entity. These standard computing systems, however, would not account for any special characteristics that an entity requires. Since most entities need numerous special characteristics to run a business, a way to build a custom computing system in a consistent, accurate, and accelerated manner is needed.

Accordingly, there are many technical challenges to building a new computing system for an entity as a custom computing system to meet the requirements particular to the entity. For example, there are issues with transparency, scalability, accuracy, and speed of building a custom computing system. As alluded to above, with millions of custom configuration options due to the different types of clouds, operating systems, database systems, product types, and the like, it is not possible to generate all possibilities for a custom system manually. Moreover, manual configuration of a new computing system creates inconsistencies, since each person working on a system has different styles, preferences, levels of detail for documentation, and the like. Further, in addition to limited options, building a system manually introduces many errors, and progress during a build of a new system is not easy to track manually.

Example embodiments provide planning tools to specify requirements specific (custom) to an entity, modeling tools for modeling different business cases, and scripts to be used to build the new computing system. Further, example embodiments provide for a several-layer hierarchy used to select scripts to execute to install and configure the new computing system. In this way, customization options for a new computing system are unlimited, each build is consistent regardless of the customization required for the new computing system, and it is easy to detect errors and track progress during a build of the new computing system. Moreover, the entire process makes for a more efficient overall system, thereby conserving computing resources and accelerating a time to build (e.g., install and configure) and new computing system.

For instance, embodiments described herein provide for receiving, from a computing device by a computing system, a selected system attribute to be used to build a new computing system for a given entity and generating, by the computing system, a subset of parameters relevant to the selected system attribute, from a plurality of parameters available for a variety of system attributes. The computing system causes display of the subset of parameters on the computing device, receives device values corresponding to each parameter of the subset of the parameters relevant the selected system attribute, and stores as custom parameters in a database the values corresponding to each of the subset of the parameters relevant to the selected system attribute. The computing system further retrieves standard parameters from a set of tables in the database and the custom parameters from the database and inputs the standard parameters and custom parameters into a decision and execution hierarchy having a plurality of levels for execution, wherein a final level in the decision and execution hierarchy comprises a plurality of scripts for execution. The computing system executes a subset of the plurality of scripts for execution based on traversing the decision and execution hierarchy using the standard parameters and custom parameters to install and configure the new computing system for the given entity.

Figure 1:
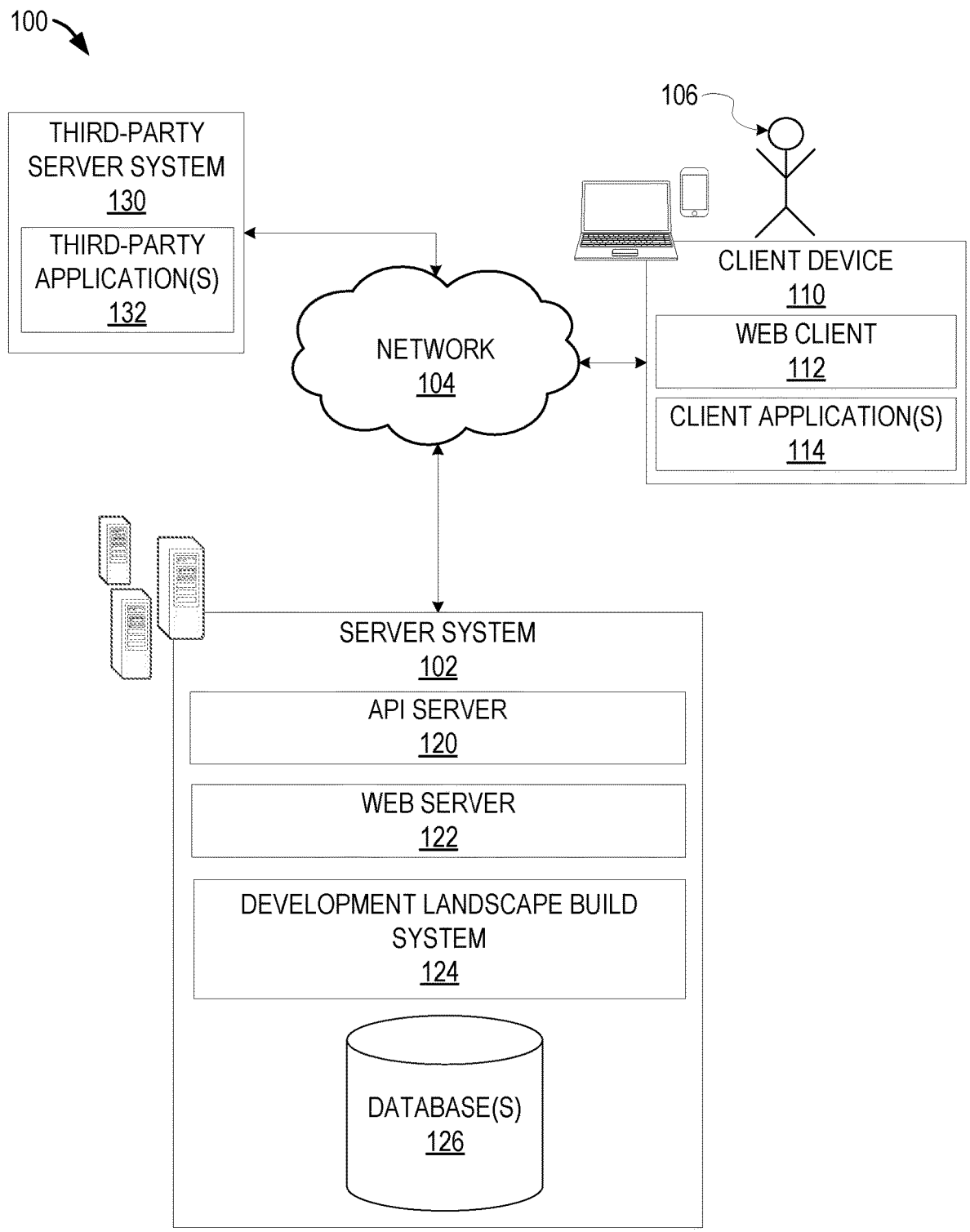
FIG. 1 is a block diagram illustrating a networked system, according to some example embodiments.

FIG. 1 is a block diagram illustrating a networked system 100, according to some example embodiments. The system 100 may include one or more client devices such as client device 110. The client device 110 may comprise, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other computing or communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user 106 that is used to access and utilize cloud services or a development landscape build system 124, among other applications.

One or more users 106 may be a person, a machine, or other means of interacting with the client device 110. In example embodiments, the user 106 may not be part of the system 100 but may interact with the system 100 via the client device 110 or other means. For instance, the user 106 may provide input (e.g., touch screen input or alphanumeric input) to the client device 110 and the input may be communicated to other entities in the system 100 (e.g., third-party server system 130, server system 102) via the network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110. In one example, the user is a developer of one or more applications (e.g., mobile and desktop web applications), a developer of models or scripts for a new computing system build, or a quality assurance engineer.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Washington State) or one or more client applications 114. The client device 110 may include one or more client applications 114 (also referred to as "apps") such as, but not limited to, a web browser, a search engine, a messaging application, an electronic mail (email) application, an e-commerce site application, a mapping or location application, an enterprise resource planning (ERP) application, a customer relationship management (CRM) application, a procurement, spend management and supply chain services application, entity matching system, a user interface for a development landscape build system, and the like.

In some embodiments, one or more client applications 114 may be included in a given client device 110, and configured to locally provide the user interface and at least some of the functionalities, with the client application(s) 114 configured to communicate with other entities in the system 100 (e.g., third-party server system 130, server system 102, etc.), on an as-needed basis, for data and/or processing capabilities not locally available (e.g., access location information, access software version information, access an ERP system, access a CRM system, access machine learning models, access procurement, spend management and supply chain services, entity matching system, to authenticate a user 106, to verify a method of payment, access test data, access a development landscape build system and so forth), to build a new computing system, and so forth. Conversely, one or more applications 114 may not be included in the client device 110, and then the client device 110 may use its web browser to access the one or more applications hosted on other entities in the system 100 (e.g., third-party server system 130, server system 102).

A server system 102 may provide server-side functionality via the network 104 (e.g., the Internet or wide area network (WAN)) to one or more third-party server system 130 and/or one or more client devices 110. The server system 102 may include an application program interface (API) server 120, a web server 122, and a development landscape build system 124 that may be communicatively coupled with one or more databases 126.

The one or more databases 126 may be storage devices that store data related to users of the system 100, applications associated with the system 100, cloud services, machine learning models, parameters, models and scripts for a new computing system build, and so forth. The one or more databases 126 may further store information related to third-party server system 130, third-party applications 132, client devices 110, client applications 114, users 106, and so forth. In one example, the one or more databases 126 is cloud-based storage.

The server system 102 may be a cloud computing environment, according to some example embodiments. The server system 102, and any servers associated with the server system 102, may be associated with a cloud-based application, in one example embodiment.

The development landscape build system 124 may provide back-end support for third-party applications 132 and client applications 114, which may include cloud-based applications. The development landscape build system 124 may provide for generating parameters, models, and scripts for a new computing system build as well as executing such scripts using the parameters and models in a hierarchical manner, as described in further detail below. The development landscape build system 124 may comprise one or more servers or other computing devices or systems.

The system 100 further includes one or more third-party server system 130. The one or more third-party server system 130 may include one or more third-party application(s). The one or more third-party application(s) 132, executing on third-party server(s) 130, may interact with the server system 102 via API server 120 via a programmatic interface provided by the API server 120. For example, one or more of the third-party applications 132 may request and utilize information from the server system 102 via the API server 120 to support one or more features or functions on a website hosted by the third party or an application hosted by the third party.

The third-party website or application 132, for example, may provide access to functionality and data supported by third-party server system 130. In one example embodiment, the third-party website or application 132 may provide access to functionality that is supported by relevant functionality and data in the third-party server system 130. In one example, a third-party server system 130 is a system associated with an entity that accesses cloud services via server system 102.

Figure 2:
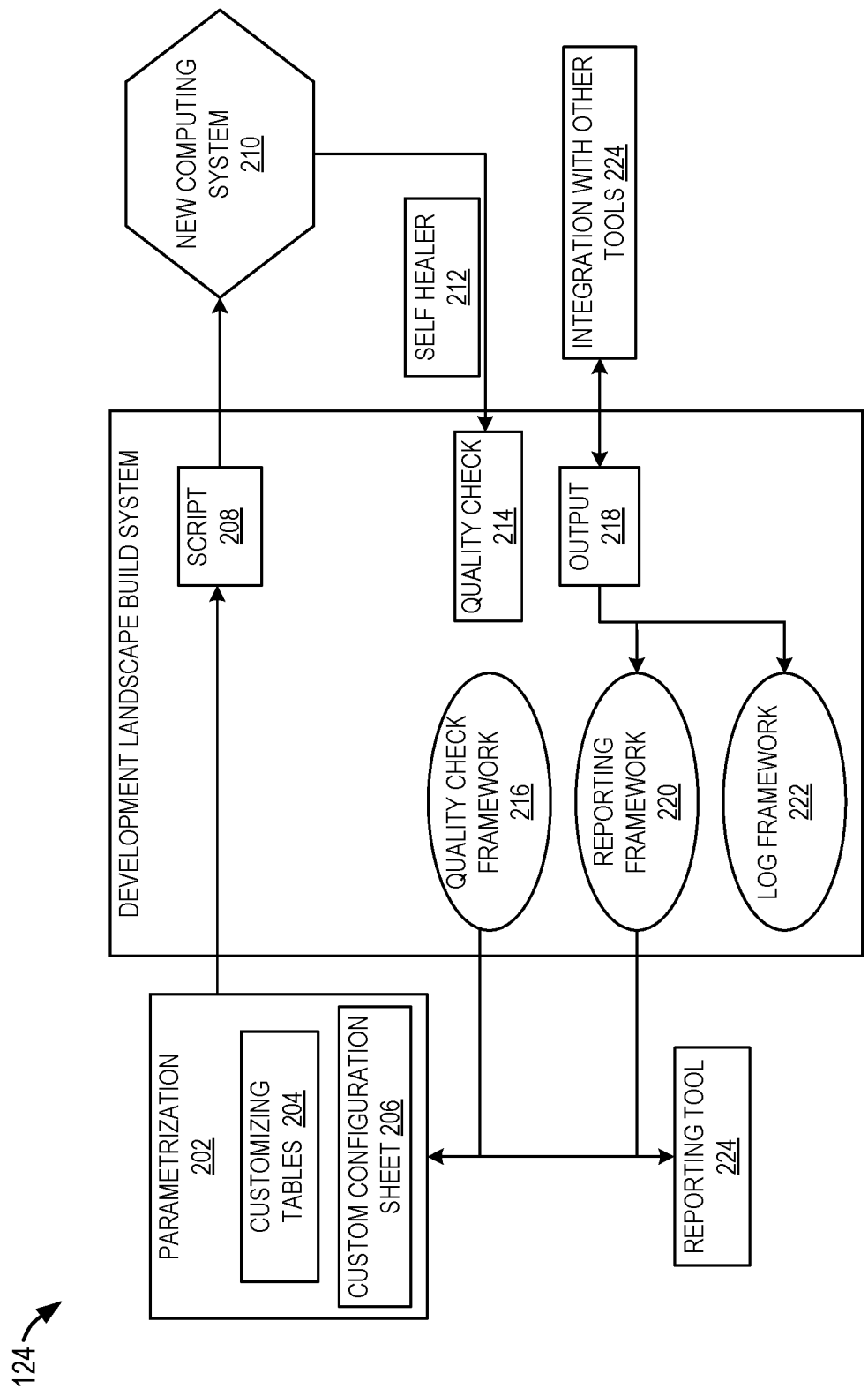
FIG. 2 is a block diagram illustrating a development landscape build system, according to some example embodiments.

FIG. 2 is a block diagram illustrating further details of development landscape build system 124. The parametrization system 202 comprises customizing tables 204 and custom configuration sheet 206. The customizing tables 204 and custom configuration sheet 206 are data sources used to generate both standard and customized parameters that are fed into the development landscape build system 124 and used to execute a script or task for installation and configuration of a new computing system 210.

Specifically, customizing tables 204 contain standard parameters that are standard across all new computing system builds. These may change with time; any changes or updates would then apply across all further new computing system builds. One example of a standard parameter is a user of the system and the role assignment for the user. For example, a developer must have specified roles or authorizations. This is a standard defined in the customizing tables 204. Typically, there are hundreds of customizing tables 204 in the development landscape build system 124. In one example, standard parameters may be specified by product type or system type or system role (e.g., system attribute). In this example, only a subset of the standard parameters may be relevant for a given product type, or system type, or system role.

FIG. 3 illustrates an example customizing table 204A that holds data relevant for creation for standard remote function calls (RFCs). This is just one example of hundreds of customization tables that can be used in the development landscape build system 124. The example customizing table 204A comprises a list of activities 302 in the first column. Each activity can be referred to as a key field. The development landscape build system 124 can call the customizing table 204A with a specified key and then read the values 306 in the columns associated with the particular key. For example, the development landscape build system 124 can call the customizing table 204A with the HOTPACKRUL key field 304 and read the values 306 associated with the HOTPACKRUL key field 304.

The development landscape build system 124 can then generate a JSON input an input form, such as a JSON input, for the HOTPACKRUL activity and populate the input form with the values 306 read from the customizing table 204A. FIG. 4 illustrates an example table entry or input form 400 for the HOTPACKRUL activity. Fixed values are entered into the respective fields and variables are maintained with the help of placeholders indicated by parameters with angle brackets < >, such as <SID>, <CLIENT> or $<ALEREMOTE00000020481>. The placeholders will be replaced with real values (e.g., from a custom configuration sheet 206) during runtime.

A configuration script or task uses the JSON input form, such as JSON input, to execute a creation of an RFC based on the values in the input form, during runtime. For example, the data is retrieved at runtime during the build process via a webservice, such as a Customizing Web Services (CWS) in JSON format, and fed as input into the script or task to be executed. An example CWS for the example input form 400 may be:
https://ldciadl.wdf.sap.corp:44315/sap/dlmoat/r3
rfc?activity=HOTPACKRUL&sid=OAS&client=000&sap-client=600. Calling this customized webservice will then populate the placeholders with values and generate the example output 500 shown in FIG. 5. For instance, the values for placeholders <SID> and <CLIENT> are generated from the custom configuration sheet 206 and added dynamically to the URL as additional arguments. Moreover, a placeholder identifier from Passvault is used to retrieve a password from Passvault which is decrypted and used at runtime whenever it is needed (e.g., like in this example where the password of the RFC user must be entered into the RFC connection). With data taken from the customizing table 204A and the custom configuration sheet 206 and Passvault, the development landscape build system 124 generates the example output 500.

Returning to FIG. 2, the custom configuration sheet 206 is where custom parameters are generated and stored that are specific to the entity for which the new computing system 210 is being built. These custom parameters include parameters such as a database type, a cloud type, a system type, a client type, a network release, a service level, an installation type, a system role, a product type, or the like. The custom configuration sheet 206 is specific to the new computing system 210 to be built and is different for each computing system to be built. The configuration sheet 206 is a tool for an individual system and client customizing data and acts as a single source of truth for customizing the new computing system 210.

Only content relevant for the intended purpose and scope of the new computing system 210 need be supplied in the custom configuration sheet 206. In one example, this is achieved by selection of a system type, installation type, and system role, as described in further detail below with respect to FIG. 7.

The development landscape build system 124 further comprises a set of scripts 208. Each configuration step in the build process for a new computing system 210 has one script assigned and does one action in the new computing system 210, such as creating an RFC, as described above. In this way, modules can be re-used during the build workflow in another context, just by feeding them different parameter values. A build comprising installation and configuration of the new computing system 210 is executed via one or more scripts 208 as described in further detail below.

The development landscape build system 124 further comprises a self healer 212 to automatically address any errors in the new computing system 210, and a quality check process 214 and quality check framework 216. The development landscape build system 124 further comprises output 218 that is used in the reporting framework 220 and log framework 222. The reporting tool 224 provides a variety of data including the output from the reporting framework 220 and quality check framework 216. The reporting tool 224 can further provide key performance indicators, such as delivery data and quality, as well as setup time and other data and metrics corresponding to the build of the new computing system 210.

The development landscape build system 124 can also utilize and integrate with other tools 226, such as SLIM, SISM, DUCC, Zeus, IdM, Nagios, ITdirect, BCP, ServiceNow, BKPMON, Procon, SWPM, and the like.

Figure 6:
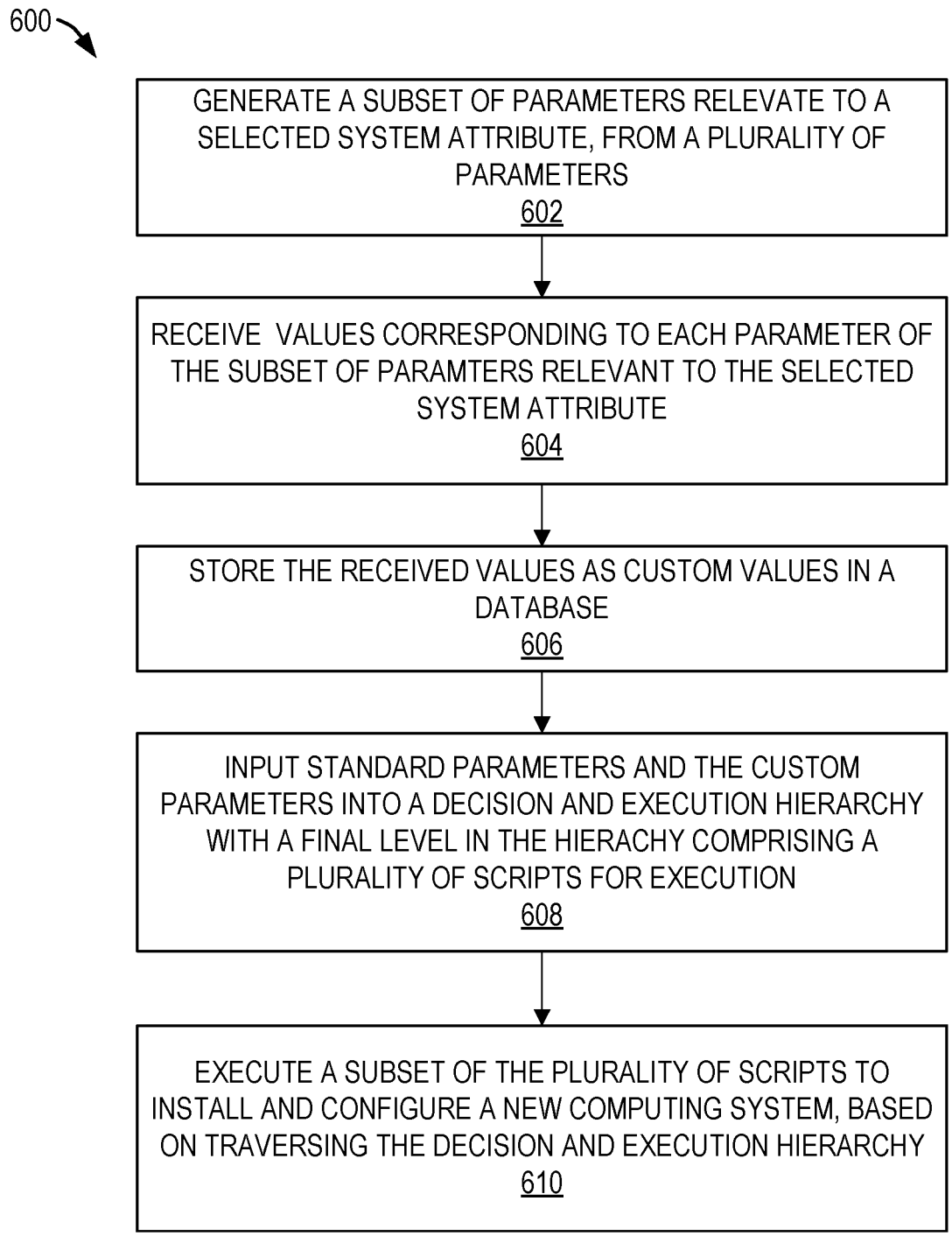
FIG. 6 comprises a flow chart illustrating aspects of a method, according to some example embodiments.

FIG. 6 is a flow chart illustrating aspects of a method 600 for installing and configuring a new computing system customized for a specific entity, according to some example embodiments. For illustrative purposes, method 600 is described with respect to the block diagrams of FIG. 1 and FIG. 2. It is to be understood that method 600 may be practiced with other system configurations in other embodiments.

Figure 7:
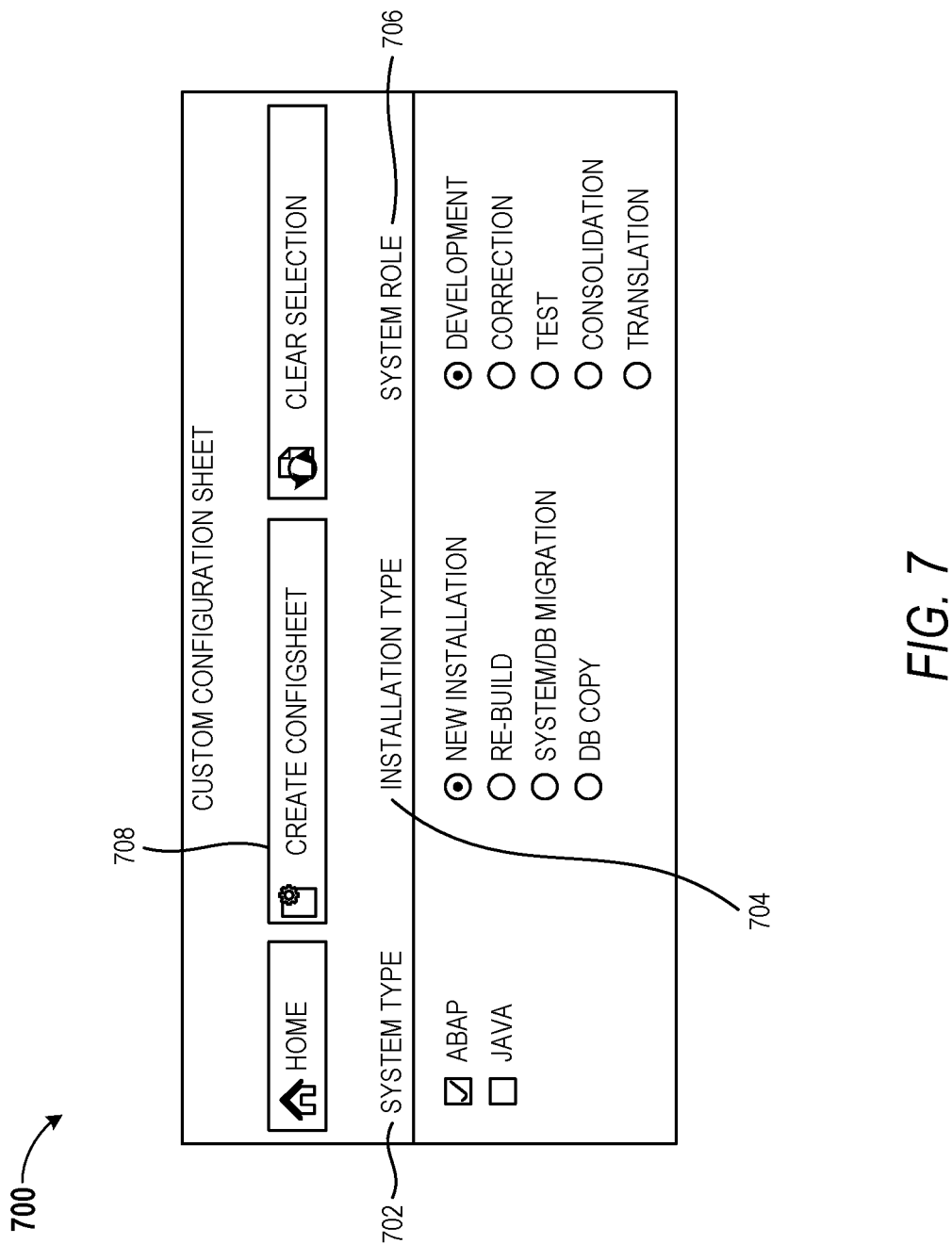
FIG. 7 illustrates an example user interface, according to some example embodiments.

In operation 602, a computing system (e.g., server system 102 or development landscape build system 124), receives a selected system attribute (e.g., system role) to be used to build a new computing system (e.g., new computing system 210) for a given entity. For example, a user, via a computing device (e.g., client device 110), interacts with a user interface on the computing device to select a system attribute to be used to build (e.g., install and configure) the new computing system. FIG. 7 illustrates an example user interface 700 for selecting a system role 706 to create a custom configuration sheet 206. In this example, there are three different categories to choose from, including a system type 702, an installation type 704, and a system role 706. It is to be understood that this is just an example; different and more or fewer categories could be used in example embodiments, and different and more or fewer options under each category could be used in example embodiments. In one example, only a system role 706 is needed to generate a custom configuration sheet 206.

As shown in the example user interface 700, a system type 702 can include ABAP (Advanced Business Application Programming) and JAVA as options to choose for system type 702. Other examples of system type 702 include J2EE, combination ABAP and J2EE (double stack), TREX Server, BOE Server, Content Server, LiveCache, Web Dispatcher, Standalone DB, HANA Standalone DB, SLT Replication Server.

The installation type 704 can be a new installation, a re-build, a system/database migration, or a database copy, in this example. The system role 706 can be development, correction, test, consolidation, or translation, in this example. Based on the selected system type 702, a suitable installation type 704 and system role 706 can be selected. As shown in the example in FIG. 7, the user has selected ABAP as the system type 702, a new installation as the installation type 704, and development as the system role 706. After making selections, the user can select to create configsheet 708 to generate the custom configuration sheet 206. The computing device then sends the selections (e.g., the selected system role or attribute) to the computing system.

After receiving the selected system role or attribute from the computing device, in operation 604, the computing system generates a subset of parameters relevant to the selected system attribute. For example, there may be a plurality of parameters available for a variety of system attributes. The computing system only selects those parameters (a subset) that are relevant to the selected system attribute. In this way, only the subset of parameters relevant to the selected system attribute are then provided to the user, via the computing device, so that the user only has to enter values for those relevant to build the new computing system.

The computing system causes display of the subset of parameters on the computing device. The user can then enter, via the display, values for each parameter of the subset of parameters. The computing device sends these entered values to the computing system. In operation 604 the computing system receives, from the computing device, the values corresponding to each parameter of the subset of parameters relevant to the selected system attribute. In operation 606, the computing system stores, as custom parameters in a database (e.g., database 126), the values corresponding to each parameter of the subset of parameters relevant to the selected system attribute. In one example, the custom parameters are stored in the database as a custom configuration sheet 206.

After the custom configuration sheet 206 is generated with the custom parameters, a business process modeler application is used to define business processes to be executed during the build for the new computing system. Scripts are assigned to each defined business process that is executed during the build for the new computing system. Each configuration step comprises a script and is included in a final level of a hierarchy for execution during a build of a new computing system, as explained further below.

To start the build process for the new computing device, the build can be accomplished by a single mouse click or other input to indicate the build should start. To start the build process, the computing system retrieves standard parameters from a set of tables in a database (e.g., database 126). As explained above, these standard parameters can be stored in customizing tables 204. The computing system also retrieves the custom parameters (e.g., custom configuration sheet 206) from the database. In operation 608, the computing system inputs the standard parameters and custom parameters into a decision and execution hierarchy. The decision and execution hierarchy comprises a plurality of levels for execution, and the final level of the plurality of the levels comprises scripts for execution. These are the scripts developed previously that are assigned to a configuration step that can be executed during the build process. Only a subset of these scripts is executed depending on custom parameters for the new computing system.

Figure 8:
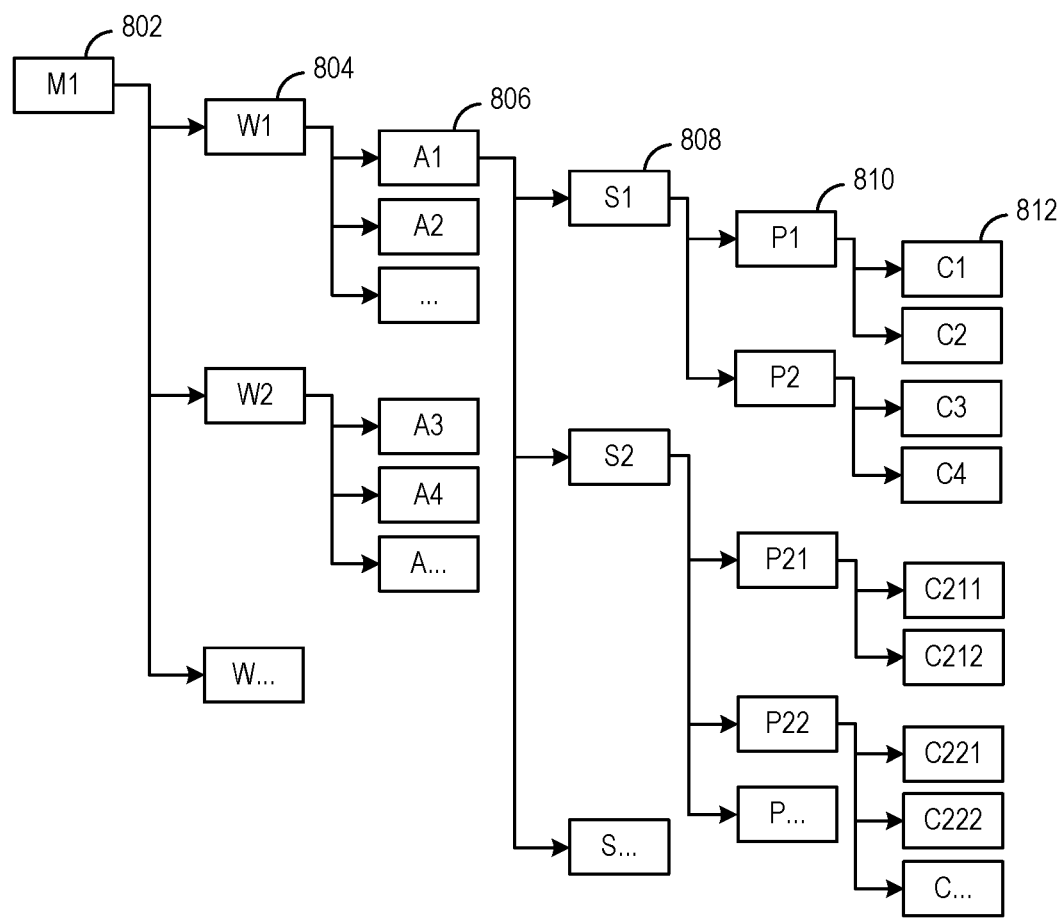
FIG. 8 illustrates an example hierarchy, according to some example embodiments.

FIG. 8 illustrates an example hierarchy 800 comprising six levels. The first five levels 802-810 each comprises sublevels where each sublevel is a decision point for moving to a next level of the hierarchy 800. For example, the first level 802, indicated by M1, comprises sublevels W1, W2, W . . . of the second level 804. Each sublevel of the second level 804 comprises specified sublevels of the third sublevel 808, and so forth until the final or sixth level 812, which does not contain any sublevels. Instead, the final level 812 comprises a plurality of configuration steps which are scripts for execution based on traversing the decision and execution hierarchy 800. It is to be understood that the six levels in the example hierarchy 800 are used as an example and that any number of levels can be used in example embodiments.

In one example, the example hierarchy 800 comprises an M-level as the highest level, which is the build wrapper calling the phases, the phases (W-level), sub-phases (A-level), configuration scenarios (S-level), configuration processes (P-level), and configuration steps (C-level). To use a specific example, we will step through the hierarchy from the build wrapper phase (M1) through a configuration step C1 to create an RFC to an ABAP Test Cockpit (ATC) reference system. In this example, the wrapper level M1 (802) is always performed, there is no exception. In one example, the wrapper level M1 (802) checks the operating system (OS) and database (DB) type. For example, if the development landscape build system 124 only supports Linux systems and not Windows for an operating system and HDB and DB2 but not MaxDB or mySQL as database types, phase installation (the second-level, W-level) is only executed for the supported OS and DB. In one example, the flow condition towards the phase installation is:

${
  variables:equals(OSTYPE, "L") and
  variables:containsAny(DBTYPE, "HDB", "DB6")
}

Variables OSTYPE and DBTYPE and their technical values are from custom configuration sheet 206 in this case. If the OS and DB type in the custom configuration sheet 206 are not supported, then a prompt to manually configure the system is provided. After determining that the OS and DB type are supported, based on the technical values for the OS type and DB type in the custom configuration sheet 206, the process continues to the next level of the hierarchy, which is the W-level 804 in this example.

In the W-level phase may comprise a main configuration phase (e.g., W1). From the main configuration phase W1, a sub-phase in the third level (A-level 806) for a standard system and landscape configuration (e.g., S1) is always performed without exception. Therefore, in this example no input is required to take a decision. In the standard system and landscape configuration sub-phase, the need of an ATC configuration is checked. In one example, the condition flow towards configuring an ATC is:

${
  variables:equals(ATC_RUNNING, true)
}

The value is taken from custom configuration sheet 206 in this case. If the condition is true, the ATC will be configured, otherwise it is entirely skipped and the development landscape build system 124 would immediately proceed to a configuration scenario to configure PQP. In this example, assuming that the condition is true, the process continues to the next level of the hierarchy, which is the fourth level (S-level 808) in this example. In the configuration scenario to configure the ATC (e.g., S1), the development landscape build system 124 checks whether the system is a so-called ATC execution system or a target system. The flow condition towards the ATC execution system is:

${
  variables:equals(ATC_CHECKM_REQ, "01")
}

The value is taken from the custom configuration sheet 206 in this case. In the case where the system is an ATC execution system, the process continues to a configuration process in the next level of the hierarchy, with is the P-level 810 in this example. In this example, the configuration process is "maintain basic ATC settings in ATC execution system" (e.g., P1). For this configuration process to maintain basic ATC settings in ATC execution system, the development landscape build system 124 checks whether a so-called reference system exists, usually withing the system landscape of a previous release. The flow condition for this is:

${
  variables:equals(CHECKS_PROF_COPY, "X") and
  variables:isEmpty(SETUP_REFERENCE_SID)
}

Both these values are taken from the custom configuration sheet 206 in this case. The above flow condition is followed in the case where a reference system is not provided and the copy of the ATC check profile is requested. Assuming that a reference system has been provided, the process continues to a configuration step (e.g., C1) for creating an RFC to an ATC reference system in the C-level of the hierarchy. The configuration step C1 is then executed, as shown an explained below with reference to FIG. 10.

Figure 9:
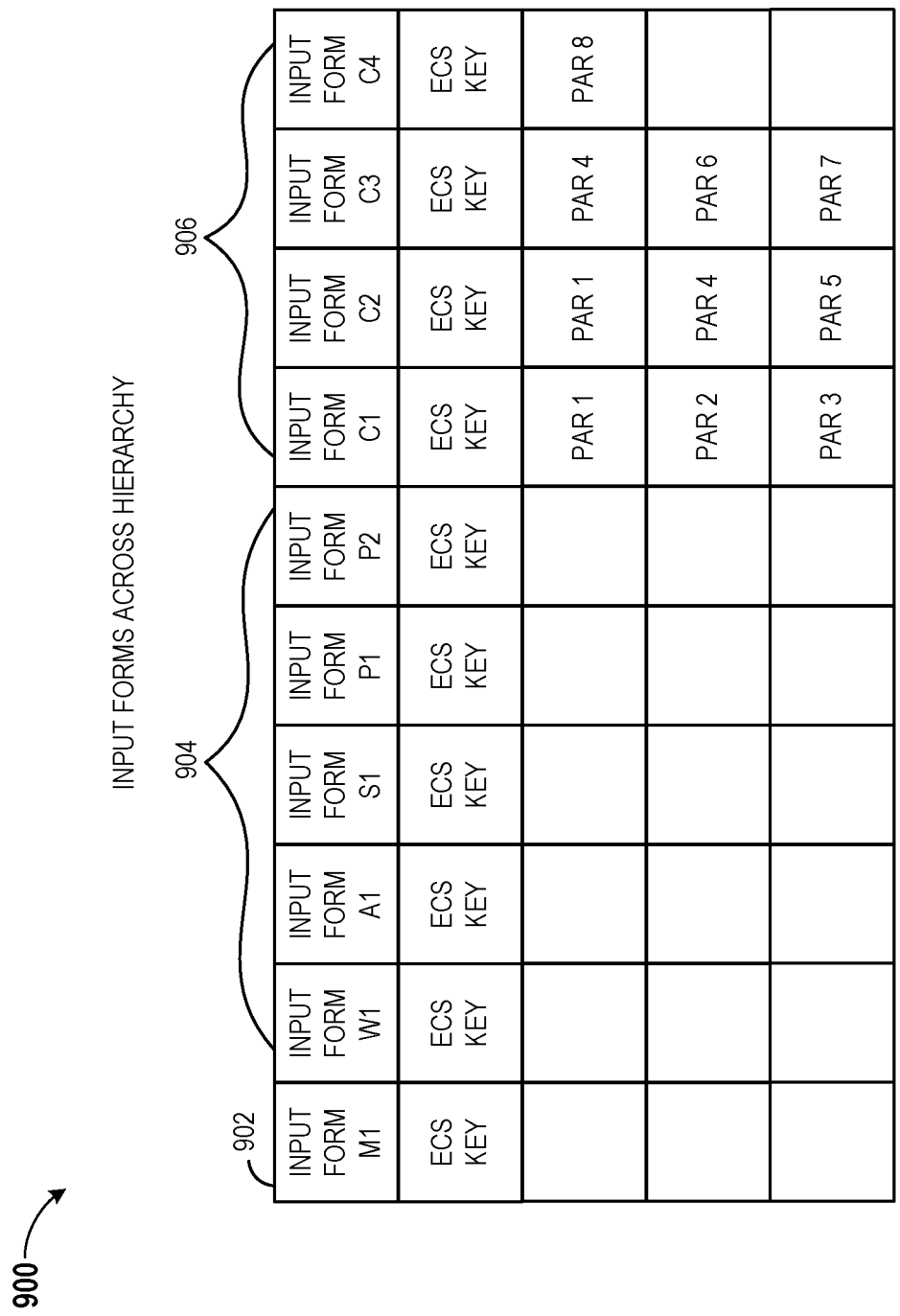
FIG. 9 shows a table indicating how an input form corresponds to each component in the hierarchy, according to some example embodiments.

Returning to FIG. 6, the computing system executes a subset of the plurality of scripts for execution based on traversing the decision and execution hierarchy using the standard parameters and custom parameters to install and configure the new computing system for the given entity, in operation 610. For example, an input form (as explained above) is generated for each component in the hierarchy. For example, an input form is generated for M1, an input form is generated for W1, an input form is generated for W2, and an input form is generated for each of A1-A4, S1-S2, P11, P12, P21, P22, and C111-C222. FIG. 9 shows a table 900 indicating how an input form corresponds to each component in the hierarchy. In the example table 900, the input form 902 for M1, which is the first level in the hierarchy, comprises "Ecs Key", which is a reference to the custom configuration sheet 206 for the new computing system. During execution, the computing system uses parameters in the custom configuration sheet 206 and the parameters in the customizing tables 204 that correspond to the specified Ecs Key and standard parameters to determine which sublevel (in second level 804) to which to branch. The same process is used for the rest of the levels 802-810 (e.g., all levels but the last level 812 that comprises the configuration steps) using their corresponding input forms as shown with reference number 904 in FIG. 9.

Likewise, each configuration step has an associated input form (such as input form 400 in shown in FIG. 4 and described above) and examples of these input forms for C1-C4 are shown as reference number 906 in FIG. 9. Note that these input forms also comprise parameters (e.g., par1, par2, par3, par4, par5, par6, par6, par8) that are used in execution of the configuration step (e.g., script).

Returning to FIG. 8 for a high-level summary, in one example the example hierarchy 800 is traversed by first evaluating standard and custom parameters, using the input form for M1, to determine whether to branch to sublevel W1 or W2 at second level 804. If the computing system determines, based on the evaluation of the standard and custom parameters, that it should branch to W1, the computing system then evaluates standard and custom parameters using the input form for W1 to determine whether it should brand to sublevel A1 or A2 at third level 806. The computing system uses the same process to then branch to Si in the fourth level 808, P2 in the fifth level 810, and then executes the configuration steps from P2 that comprise C3 and C4 using the input forms for each of C3 and C4.

In one example, indications on which processes can be executed in parallel and which processes are dependent upon another process and thus, must be executed in a particular order, are built into the hierarchy. For example, a parallel gateway or other indicator can be used to indicate parallel flows to execute independent activities in a parallel matter. In another example, a flow from a first process or activity to a second process or activity can indicate that the second process or activity is dependent on the first process or activity. Thus, the second process or activity will only execute when the first process or activity is completed.

As explained above, a configuration step is the smallest entity and on the lowest level of the hierarchy. In one example, the hierarchy is maintained in an open-source workflow engine, Flowable. It is to be understood that different environments or tools can be used in example embodiments. In example embodiments, there may be over a thousand or thousands of individual configuration steps.

As also explained above, a configuration step is in the form of a script and is a business process which consists of many elements that serve a specific purpose, such as the RFC example shown in FIG. 4 and described above.

Figure 10:
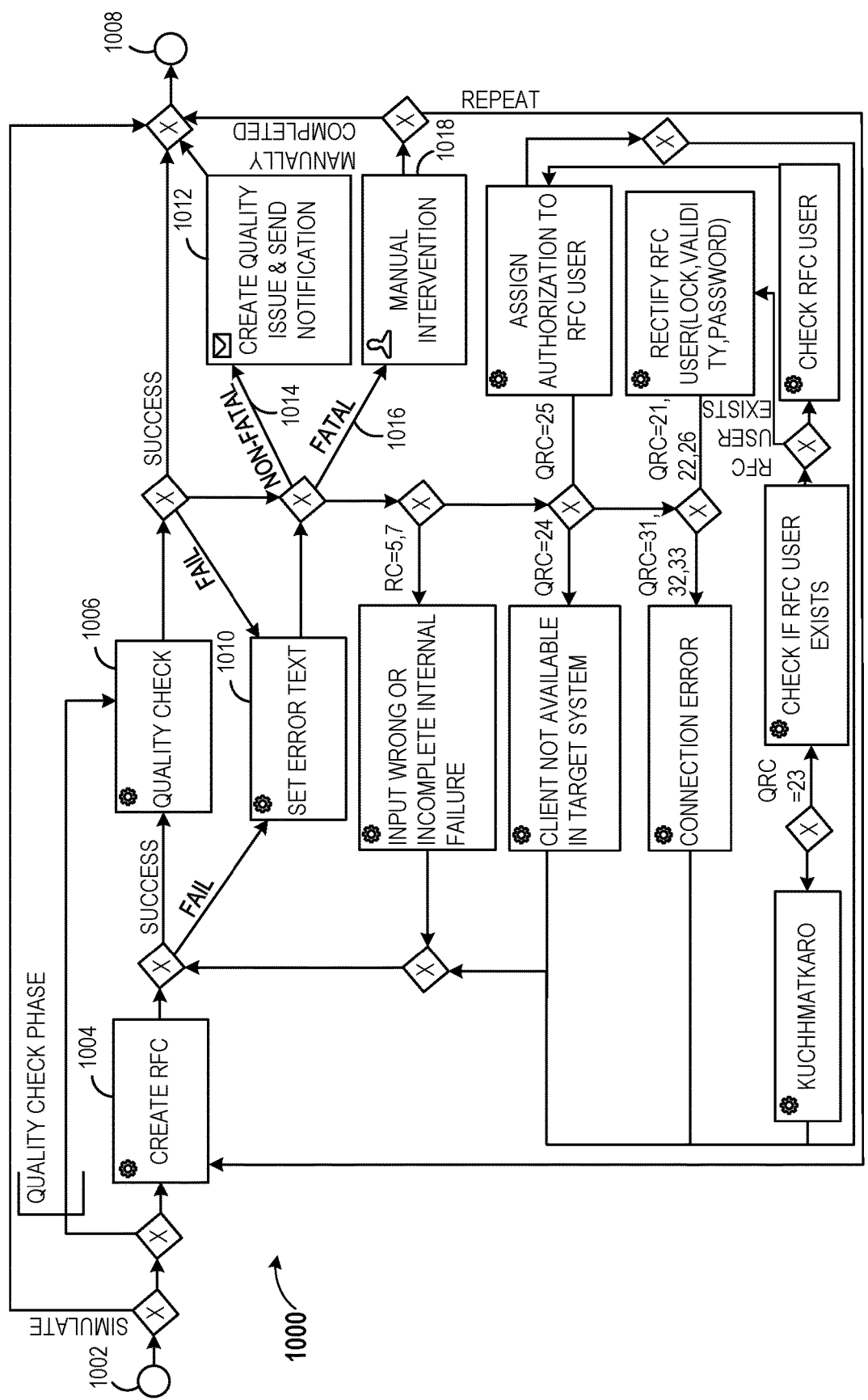
FIG. 10 illustrates an example model for a configuration step, according to some example embodiments.

FIG. 10 illustrates an example model 1000 for a configuration step for creating an RFC connection or destination to other systems. At a start event 1002, the computing system reads the parameter values relevant for the script. As explained above, this is done using the input form corresponding to the configuration step. For example, to create an RFC connection, certain values are needed, such as the target system, the target client, the user, the password, and so forth. The values for these parameters are all part of the corresponding input form. Using the values, the RFC is created at operation 1004.

The configuration can be verified by a quality check 1006. The quality check 1006 is a service task to make sure that the configuration was done successfully. If the quality check 1006 returns a success (e.g., no errors were found) then the process ends at the end event 1008. If the quality check 1006 detects at least one error, then the computing system sets the specific error text at 1010 based on return codes returned from the quality check 1006 and proceeds to the self-healing (e.g., via self-healer 212 of FIG. 2). For example, the respective error text triggers the required self-healing via respective flow conditions and thus, the system executes a self-healing process specific for the error type. Various self-healing tasks can be included in the configuration step. In this way, some errors can be automatically fixed.

After self-healing, a quality check 1006 is again performed to check if any further errors are detected. If the exact same error occurs a second time, the process flow is directed toward error handling to avoid a loop. For error handling, there are two options, depending on the severity of the error. For example, in the case where the overall build workflow can proceed despite the presence of an error, the error type is a non-fatal error and the computing system directs the flow to the non-fatal error branch 1014 and proceeds to creating a quality issue and sending a notification at operation 1012 (e.g., to a recipient such as a system builder or build lead). A non-fatal error can typically be handled at any later point in time.

In the case where the build must stop because the error happens at a configuration step which is a prerequisite for the build workflow to proceed and later configuration steps to be successful, the computing system directs the flow to the fatal error branch 1016 for a manual intervention 1018. For example, the computing system creates a quality issue and send an error notification like described above for the non-fatal error. The build resumes only after the root cause of the error has been eliminated (e.g., by a system builder) or after a system builder decides to do the configuration manually in the system or ignore the error.

In view of the above disclosure, various examples are set forth below. It should be noted that one or more features of an example, taken in isolation or combination, should be considered withing the disclosure of this application.

Example 1. A computer-implemented method comprising:
receiving, from a computing device by a computing system, a selected system attribute to be used to build a new computing system for a given entity;
generating, by the computing system, a subset of parameters relevant to the selected system attribute, from a plurality of parameters available for a variety of system attributes;
causing, by the computing system, display of the subset of the parameters on the computing device;
receiving, from the computing device by the computing device, values corresponding to each parameter of the subset of the parameters relevant to the selected system attribute;
storing as custom parameters in a database, by the computing system, the values corresponding to each of the subset of the parameters relevant to the selected system attribute;
retrieving, by a computing system, standard parameters from a set of tables in the database;
retrieving, by the computing system, the custom parameters from the database;
inputting, by the computing system, the standard parameters and custom parameters into a decision and execution hierarchy having a plurality of levels for execution, wherein a final level in the decision and execution hierarchy comprises a plurality of scripts for execution; and executing, by the computing system, a subset of the plurality of scripts for execution based on traversing the decision and execution hierarchy using the standard parameters and custom parameters to install and configure the new computing system for the given entity.

Example 2. A computer-implemented method according to any of the previous examples, wherein the custom parameters are parameters that are used to build the new computing system as a custom computing system.

Example 3. A computer-implemented method according to any of the previous examples, wherein the standard parameters are parameters that are standard for building any final computing system.

Example 4. A computer-implemented method according to any of the previous examples, wherein an input form is generated for each of the plurality of scripts, the input form comprising the parameters for execution of a respective script.

Example 5. A computer-implemented method according to any of the previous examples, wherein after successful execution of each script of the subset of the plurality of scripts, the method comprises:
performing a quality check to determine whether any errors are present;
based on determining at least one error is present, determining an error type; and executing a self-healing process specific for the error type.

Example 6. A computer-implemented method according to any of the previous examples, further comprising:
determining that the error type is a non-fatal error; and
generating a quality issue and sending a notification corresponding to the error type.

Example 7. A computer-implemented method according to any of the previous examples, further comprising:
determining that the error type is fatal, indicating that completion of a script is a prerequisite for a build of the new computing system to proceed; and
stopping execution of the subset of the plurality of scripts.

Example 8. A computer-implemented method according to any of the previous examples, wherein each level of the plurality of levels before the final level comprises sublevels, wherein each sublevel is a decision point for moving to a next level of the plurality of levels.

Example 9. A system comprising:
a memory that stores instructions; and
one or more processors configured by the instructions to perform operations comprising:
receiving, from a computing device, a selected system attribute to be used to build a new computing system for a given entity;

generating a subset of parameters relevant to the selected system attribute, from a plurality of parameters available for a variety of system attributes;
causing display of the subset of the parameters on the computing device;
receiving, from the computing device, values corresponding to each parameter of the subset of the parameters relevant to the selected system attribute;
storing, as custom parameters in a database, the values corresponding to each of the subset of the parameters relevant to the selected system attribute;
retrieving standard parameters from a set of tables in the database;
retrieving the custom parameters from the database;
inputting the standard parameters and custom parameters into a decision and execution hierarchy having a plurality of levels for execution, wherein a final level in the decision and execution hierarchy comprises a plurality of scripts for execution; and
executing a subset of the plurality of scripts for execution based on traversing the decision and execution hierarchy using the standard parameters and custom parameters to install and configure the new computing system for the given entity.

Example 10. A system according to any of the previous examples, wherein the custom parameters are parameters that are used to build the new computing system as a custom computing system.

Example 11. A system according to any of the previous examples, wherein the standard parameters are parameters that are standard for building any final computing system.

Example 12. A system according to any of the previous examples, wherein an input form is generated for each of the plurality of scripts, the input form comprising the parameters for execution of a respective script.

Example 13. A system according to any of the previous examples, wherein after successful execution of each script of the subset of the plurality of scripts, the operations comprise:
performing a quality check to determine whether any errors are present;
based on determining at least one error is present, determining an error type; and
executing a self-healing process specific for the error type.

Example 14. A system according to any of the previous examples, further comprising:
determining that the error type is a non-fatal error; and
generating a quality issue and sending a notification corresponding to the error type.

Example 15. A system according to any of the previous examples, further comprising:
determining that the error type is fatal, indicating that completion of a script is a prerequisite for a build of the new computing system to proceed; and
stopping execution of the subset of the plurality of scripts.

Example 16. A system according to any of the previous examples, wherein each level of the plurality of levels before the final level comprises sublevels, wherein each sublevel is a decision point for moving to a next level of the plurality of levels.

Example 17. A non-transitory computer-readable medium comprising instructions stored thereon that are executable by at least one processor to cause a computing device to perform operations comprising:
receiving, from a computing device, a selected system attribute to be used to build a new computing system for a given entity;
generating a subset of parameters relevant to the selected system attribute, from a plurality of parameters available for a variety of system attributes;
causing display of the subset of the parameters on the computing device;
receiving, from the computing device, values corresponding to each parameter of the subset of the parameters relevant to the selected system attribute;
storing, as custom parameters in a database, the values corresponding to each of the subset of the parameters relevant to the selected system attribute;
retrieving standard parameters from a set of tables in the database;
retrieving the custom parameters from the database;
inputting the standard parameters and custom parameters into a decision and execution hierarchy having a plurality of levels for execution, wherein a final level in the decision and execution hierarchy comprises a plurality of scripts for execution; and
executing a subset of the plurality of scripts for execution based on traversing the decision and execution hierarchy using the standard parameters and custom parameters to install and configure the new computing system for the given entity.

Example 18. A non-transitory computer-readable medium according to any of the previous examples, wherein an input form is generated for each of the plurality of scripts, the input form comprising the parameters for execution of a respective script.

Example 19. A non-transitory computer-readable medium according to any of the previous examples, wherein after successful execution of each script of the subset of the plurality of scripts, the operations comprise:
performing a quality check to determine whether any errors are present;
based on determining at least one error is present, determining an error type;
executing a self-healing process specific for the error type;
based on determining that the error type is a non-fatal error, generating a quality issue and sending a notification corresponding to the error type; and
based on determining that the error type is fatal, indicating that completion of a script is a prerequisite for a build of the new computing system to proceed, stopping execution of the subset of the plurality of scripts.

Example 20. A non-transitory computer-readable medium according to any of the previous examples, wherein each level of the plurality of levels before the final level comprises sublevels, wherein each sublevel is a decision point for moving to a next level of the plurality of levels.

Figure 12:
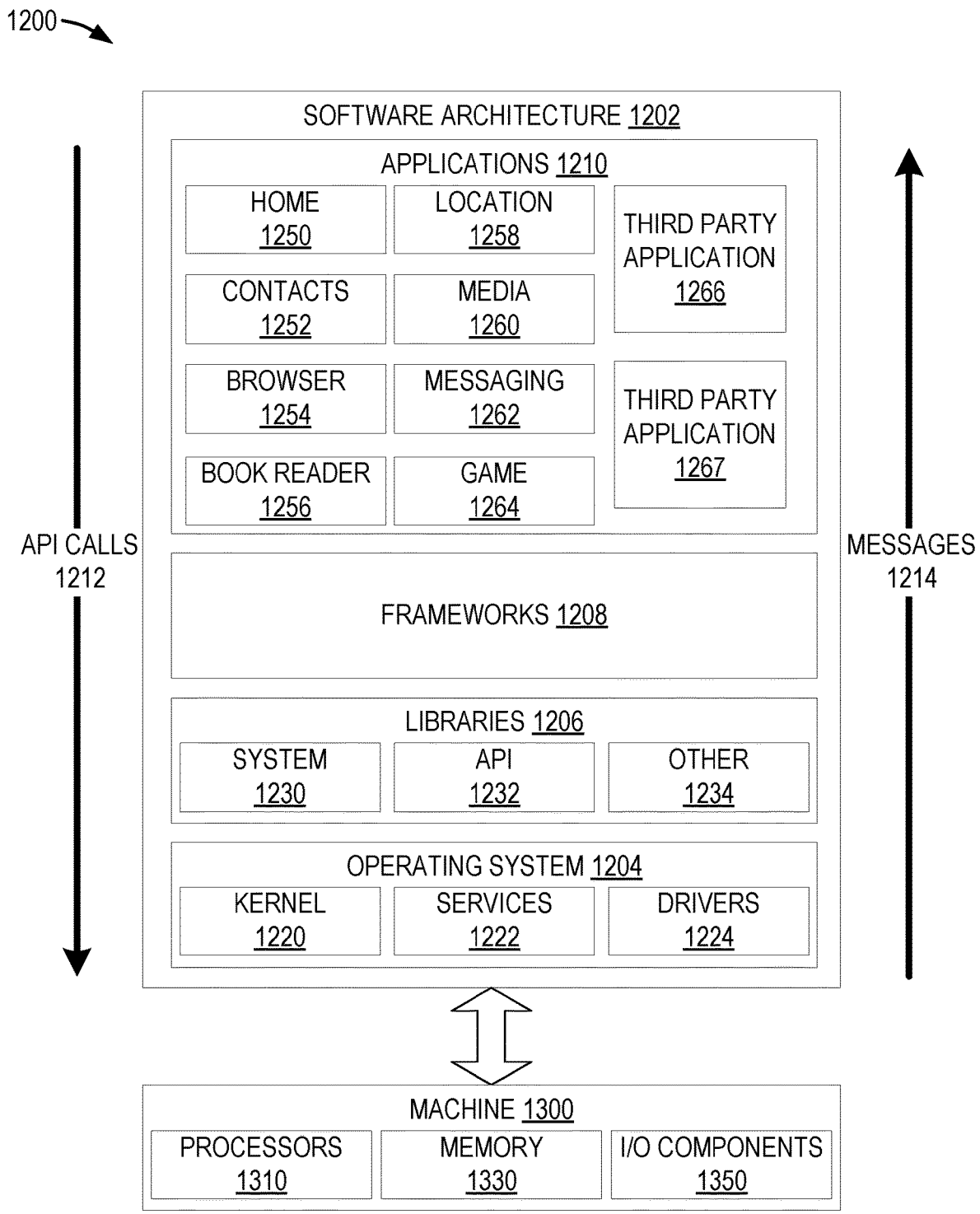
FIG. 12 is a block diagram illustrating an example of a software architecture that may be installed on a machine, according to some example embodiments.

FIG. 12 is a block diagram 1200 illustrating software architecture 1202, which can be installed on any one or more of the devices described above. For example, in various embodiments, client devices 110 and servers and systems 130, 102, 120, 122, and 124 may be implemented using some or all of the elements of software architecture 1202. FIG. 12 is merely a non-limiting example of a software architecture, and it will be appreciated that many other architectures can be implemented to facilitate the functionality described herein. In various embodiments, the software architecture 1202 is implemented by hardware such as machine 1300 of FIG. 13 that includes processors 1310, memory 1330, and I/O components 1350. In this example, the software architecture 1202 can be conceptualized as a stack of layers where each layer may provide a particular functionality. For example, the software architecture 1202 includes layers such as an operating system 1204, libraries 1206, frameworks 1208, and applications 1210. Operationally, the applications 1210 invoke application programming interface (API) calls 1212 through the software stack and receive messages 1214 in response to the API calls 1212, consistent with some embodiments.

In various implementations, the operating system 1204 manages hardware resources and provides common services. The operating system 1204 includes, for example, a kernel 1220, services 1222, and drivers 1224. The kernel 1220 acts as an abstraction layer between the hardware and the other software layers, consistent with some embodiments. For example, the kernel 1220 provides memory management, processor management (e.g., scheduling), component management, networking, and security settings, among other functionality. The services 1222 can provide other common services for the other software layers. The drivers 1224 are responsible for controlling or interfacing with the underlying hardware, according to some embodiments. For instance, the drivers 1224 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1206 provide a low-level common infrastructure utilized by the applications 1210. The libraries 1206 can include system libraries 1230 (e.g., C standard library) that can provide functions such as memory allocation functions, string manipulation functions, mathematic functions, and the like. In addition, the libraries 1206 can include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 1206 can also include a wide variety of other libraries 1234 to provide many other APIs to the applications 1210.

The frameworks 1208 provide a high-level common infrastructure that can be utilized by the applications 1210, according to some embodiments. For example, the frameworks 1208 provide various graphic user interface (GUI) functions, high-level resource management, high-level location services, and so forth. The frameworks 1208 can provide a broad spectrum of other APIs that can be utilized by the applications 1210, some of which may be specific to a particular operating system 1204 or platform.

In an example embodiment, the applications 1210 include a home application 1250, a contacts application 1252, a browser application 1254, a book reader application 1256, a location application 1258, a media application 1260, a messaging application 1262, a game application 1264, and a broad assortment of other applications such as third-party applications 1266 and 1267. According to some embodiments, the applications 1210 are programs that execute functions defined in the programs. Various programming languages can be employed to create one or more of the applications 1210, structured in a variety of manners, such as object-oriented programming languages (e.g., Objective-C, Java, or C++) or procedural programming languages (e.g., C or assembly language). In a specific example, the third-party application 1266 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1266 can invoke the API calls 1212 provided by the operating system 1204 to facilitate functionality described herein.

Figure 13:
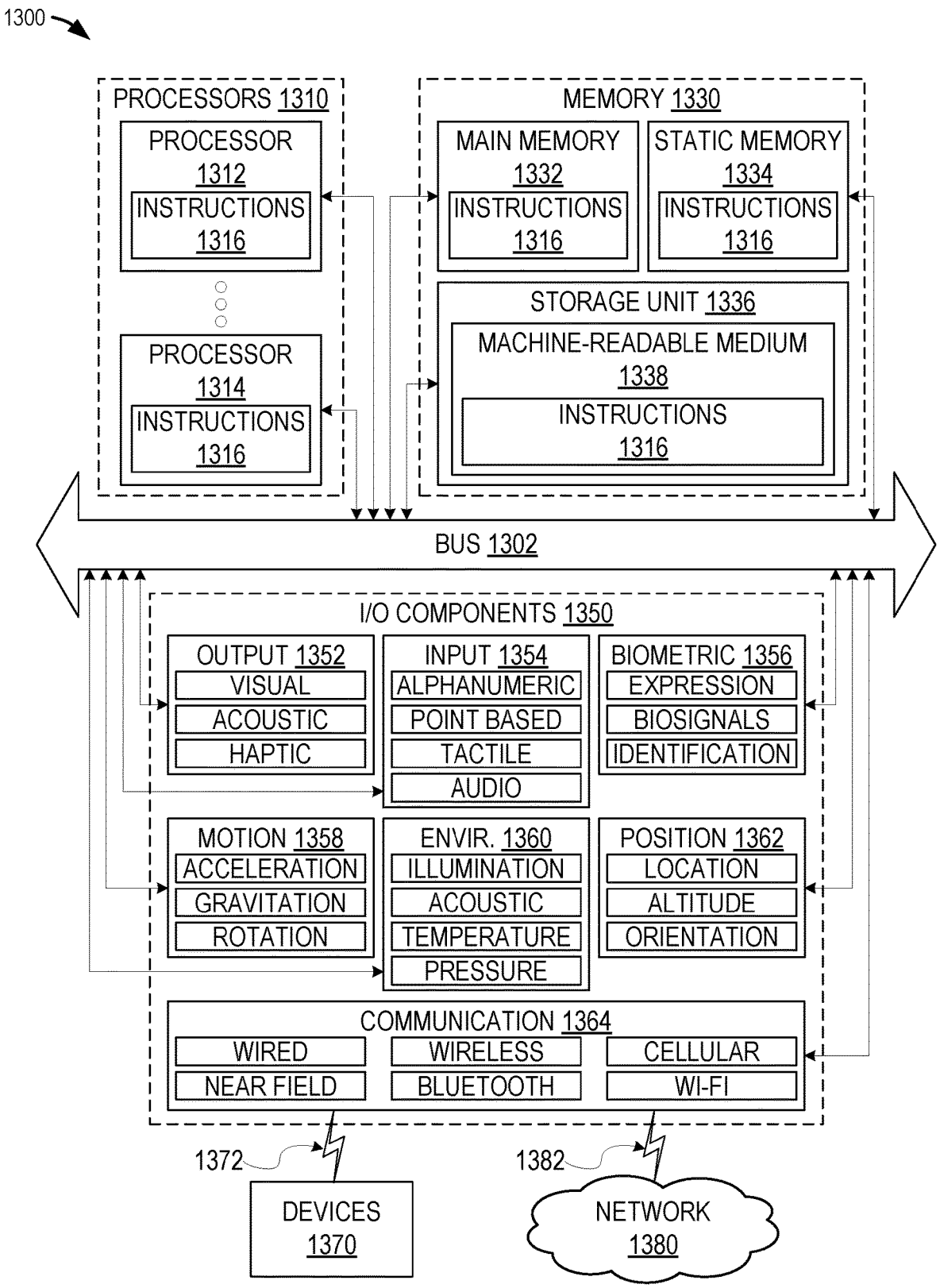
FIG. 13 illustrates a diagrammatic representation of a machine, in the form of a computer system, within which a set of instructions may be executed for causing the machine to perform any one or more of the methodologies discussed herein, according to an example embodiment.

FIG. 13 is a block diagram illustrating components of a machine 1300, according to some embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1316 (e.g., software, a program, an application 1210, an applet, an app, or other executable code) for causing the machine 1300 to perform any one or more of the methodologies discussed herein can be executed. In alternative embodiments, the machine 1300 operates as a standalone device or can be coupled (e.g., networked) to other machines. In a networked deployment, the machine 1300 may operate in the capacity of a server machine or system 130, 102, 120, 122, 124, etc., or a client device 110 in a server-client network environment, or as a peer machine in a peer-to-peer (or distributed) network environment. The machine 1300 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1316 to perform any one or more of the methodologies discussed herein.

In various embodiments, the machine 1300 comprises processors 1310, memory 1330, and I/O components 1350, which can be configured to communicate with each other via a bus 1302. In an example embodiment, the processors 1310 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1312 and a processor 1314 that may execute the instructions 1316. The term "processor" is intended to include multi-core processors 1310 that may comprise two or more independent processors 1312, 1314 (also referred to as "cores") that can execute instructions 1316 contemporaneously. Although FIG. 13 shows multiple processors 1310, the machine 1300 may include a single processor 1310 with a single core, a single processor 1310 with multiple cores (e.g., a multi-core processor 1310), multiple processors 1312, 1314 with a single core, multiple processors 1312, 1314 with multiples cores, or any combination thereof.

The memory 1330 comprises a main memory 1332, a static memory 1334, and a storage unit 1336 accessible to the processors 1310 via the bus 1302, according to some embodiments. The storage unit 1336 can include a machine-readable medium 1338 on which are stored the instructions 1316 embodying any one or more of the methodologies or functions described herein. The instructions 1316 can also reside, completely or at least partially, within the main memory 1332, within the static memory 1334, within at least one of the processors 1310 (e.g., within the processor's cache memory), or any suitable combination thereof, during execution thereof by the machine 1300. Accordingly, in various embodiments, the main memory 1332, the static memory 1334, and the processors 1310 are considered machine-readable media 1338.

As used herein, the term "memory" refers to a machine-readable medium 1338 able to store data temporarily or permanently and may be taken to include, but not be limited to, random-access memory (RAM), read-only memory (ROM), buffer memory, flash memory, and cache memory. While the machine-readable medium 1338 is shown, in an example embodiment, to be a single medium, the term "machine-readable medium" should be taken to include a single medium or multiple media (e.g., a centralized or distributed database, or associated caches and servers) able to store the instructions 1316. The term "machine-readable medium" shall also be taken to include any medium, or combination of multiple media, that is capable of storing instructions (e.g., instructions 1316) for execution by a machine (e.g., machine 1300), such that the instructions 1316, when executed by one or more processors of the machine 1300 (e.g., processors 1310), cause the machine 1300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1350 include a wide variety of components to receive input, provide output, produce output, transmit information, exchange information, capture measurements, and so on. In general, it will be appreciated that the I/O components 1350 can include many other components that are not shown in FIG. 13. The I/O components 1350 are grouped according to functionality merely for simplifying the following discussion, and the grouping is in no way limiting. In various example embodiments, the I/O components 1350 include output components 1352 and input components 1354. The output components 1352 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1354 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1350 include biometric components 1356, motion components 1358, environmental components 1360, or position components 1362, among a wide array of other components. For example, the biometric components 1356 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1358 include acceleration sensor components (e.g., accelerometer), gravitation sensor components, rotation sensor components (e.g., gyroscope), and so forth. The environmental components 1360 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1362 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 include a network interface component or another suitable device to interface with the network 1380. In further examples, communication components 1364 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1370 may be another machine 1300 or any of a wide variety of peripheral devices (e.g., a peripheral device coupled via a Universal Serial Bus (USB)).

Moreover, in some embodiments, the communication components 1364 detect identifiers or include components operable to detect identifiers. For example, the communication components 1364 include radio frequency identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1364, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1380 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1380 or a portion of the network 1380 may include a wireless or cellular network, and the coupling 1382 may be a Code Division Multiple Access (CDMA) connection, a Global System for Mobile communications (GSM) connection, or another type of cellular or wireless coupling. In this example, the coupling 1382 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1316 are transmitted or received over the network 1380 using a transmission medium via a network interface device (e.g., a network interface component included in the communication components 1364) and utilizing any one of a number of well-known transfer protocols (e.g., Hypertext Transfer Protocol (HTTP)). Similarly, in other example embodiments, the instructions 1316 are transmitted or received using a transmission medium via the coupling 1372 (e.g., a peer-to-peer coupling) to the devices 1370. The term "transmission medium" shall be taken to include any intangible medium that is capable of storing, encoding, or carrying the instructions 1316 for execution by the machine 1300, and includes digital or analog communications signals or other intangible media to facilitate communication of such software.

Furthermore, the machine-readable medium 1338 is non-transitory (in other words, not having any transitory signals) in that it does not embody a propagating signal. However, labeling the machine-readable medium 1338 "non-transitory" should not be construed to mean that the medium is incapable of movement; the medium 1338 should be considered as being transportable from one physical location to another. Additionally, since the machine-readable medium 1338 is tangible, the medium 1338 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
   receiving, from a computing device by a computing system, a selected system attribute to be used to build a new computing system for a given entity;
   selecting, from a plurality of parameters available for a variety of system attributes, by the computing system, only parameters relevant to the selected system attribute, to generate relevant parameters to the selected system attribute;
   receiving, from the computing device by the computing system a value for each parameter of the relevant parameters to the selected system attribute;
   storing as custom parameters in a database, by the computing system, the value for each parameter of the relevant parameters to the selected system attribute;

defining business processes to be executed during a build for the new computing system based on the custom parameters;

assigning a script to each defined business process;

retrieving, from a set of tables in the database, by the computing system, standard parameters relevant to the selected system attribute, the standard parameters comprising parameters that are standard across all computing system builds for the selected system attribute;

traversing a decision and execution hierarchy having a plurality of levels for execution by evaluating the standard parameters and the custom parameters at each level of the hierarchy to determine which component on a next level of the hierarchy to branch to next, wherein a final level of each branch in the decision and execution hierarchy comprises one or more scripts, of the scripts assigned to each defined business process, for execution to build the new computing system for the given entity for execution; and executing, by the computing system, scripts in the final level of the decision and execution hierarchy based on traversing the decision and execution hierarchy and using the standard parameters and custom parameters to install and configure the new computing system for the given entity.

2. The computer-implemented method of claim 1, wherein the custom parameters are parameters that are used to build the new computing system as a custom computing system.

3. The computer-implemented method of claim 1, wherein an input form is generated for each of the scripts, the input form comprising the parameters for execution of a respective script.

4. The computer-implemented method of claim 1, wherein after successful execution of each script, the method comprises:

performing a quality check to determine whether any errors are present;

based on determining at least one error is present, determining an error type; and executing a self-healing process specific for the error type.

5. The computer-implemented method of claim 4, further comprising:

determining that the error type is a non-fatal error; and generating a quality issue and sending a notification corresponding to the error type.

6. The computer-implemented method of claim 4, further comprising:

determining that the error type is fatal, indicating that completion of a script is a prerequisite for a build of the new computing system to proceed; and stopping execution of the scripts in the final level of the decision and execution hierarchy.

7. The computer-implemented method of claim 1, wherein each level of the plurality of levels before the final level comprises sublevels, wherein each sublevel is a decision point for moving to a next level of the plurality of levels.

8. The computer-implemented method of claim 1, wherein the custom parameters are stored to a custom configuration sheet specific to the new computing system to be built for the given entity.

9. The computer-implemented method of claim 1, wherein the selected system attribute comprises at least one of a system type, an installation type, and a system role.

10. A system comprising:

a memory that stores instructions; and one or more processors configured by the instructions to perform operations comprising:

receiving, from a computing device, a selected system attribute to be used to build a new computing system for a given entity;

selecting, from a plurality of parameters available for a variety of system attributes, only parameters relevant to the selected system attribute, to generate relevant parameters to the selected system attribute;

receiving, from the computing device, a value for each parameter of the relevant parameters to the selected system attribute;

storing, as custom parameters in a database, the value for each parameter of the relevant parameters to the selected system attribute;

defining business processes to be executed during a build for the new computing system based on the custom parameters;

assigning a script to each defined business process;

retrieving, from a set of tables in the database, standard parameters relevant to the selected system attribute, the standard parameters comprising parameters that are standard across all computing system builds for the selected system attribute;

traversing a decision and execution hierarchy having a plurality of levels for execution by evaluating the standard parameters and the custom parameters at each level of the hierarchy to determine which component on a next level of the hierarchy to branch to next, wherein a final level of each branch in the decision and execution hierarchy comprises one or more scripts, of the scripts assigned to each defined business process, for execution to build the new computing system for the given entity for execution; and executing scripts in the final level of the decision and execution hierarchy based on traversing the decision and execution hierarchy and using the standard parameters and custom parameters to install and configure the new computing system for the given entity.

11. The system of claim 10, wherein the custom parameters are parameters that are used to build the new computing system as a custom computing system.

12. The system of claim 10, wherein an input form is generated for each of the scripts, the input form comprising the parameters for execution of a respective script.

13. The system of claim 10, wherein after successful execution of each script, the operations comprise:

performing a quality check to determine whether any errors are present;

based on determining at least one error is present, determining an error type; and executing a self-healing process specific for the error type.

14. The system of claim 13, further comprising:

determining that the error type is a non-fatal error; and generating a quality issue and sending a notification corresponding to the error type.

15. The system of claim 13, further comprising:

determining that the error type is fatal, indicating that completion of a script is a prerequisite for a build of the new computing system to proceed; and stopping execution of the scripts.

16. The system of claim 10, wherein each level of the plurality of levels before the final level comprises sublevels, wherein each sublevel is a decision point for moving to a next level of the plurality of levels.

17. A non-transitory computer-readable medium comprising instructions stored thereon that are executable by at least one processor to cause a computing device to perform operations comprising:
- receiving, from a computing device, a selected system attribute to be used to build a new computing system for a given entity;
- selecting, from a plurality of parameters available for a variety of system attributes, only parameters relevant to the selected system attribute, to generate relevant parameters to the selected system attribute;
- receiving, from the computing device, a value for each parameter of the relevant parameters to the selected system attribute;
- storing, as custom parameters in a database, the value for each parameter of the relevant parameters to the selected system attribute;
- defining business processes to be executed during a build for the new computing system based on the custom parameters;
- assigning a script to each defined business process;
- retrieving, from a set of tables in the database, standard parameters relevant to the selected system attribute, the standard parameters comprising parameters that are standard across all computing system builds for the selected system attribute;
- traversing a decision and execution hierarchy having a plurality of levels for execution by evaluating the standard parameters and the custom parameters at each level of the hierarchy to determine which component on a next level of the hierarchy to branch to next, wherein a final level of each branch in the decision and execution hierarchy comprises one or more scripts, of the scripts assigned to each defined business process, for execution to build the new computing system for the given entity for execution; and
- executing scripts in the final level of the decision and execution hierarchy based on traversing the decision and execution hierarchy and using the standard parameters and custom parameters to install and configure the new computing system for the given entity.

18. The non-transitory computer-readable medium of claim 17, wherein an input form is generated for each of the scripts, the input form comprising the parameters for execution of a respective script.

19. The non-transitory computer-readable medium of claim 17, wherein
after successful execution of each script, the operations comprise:
- performing a quality check to determine whether any errors are present;
- based on determining at least one error is present, determining an error type;
- executing a self-healing process specific for the error type;
- based on determining that the error type is a non-fatal error, generating a quality issue and sending a notification corresponding to the error type; and
- based on determining that the error type is fatal, indicating that completion of a script is a prerequisite for a build of the new computing system to proceed, stopping execution of the scripts.

20. The non-transitory computer-readable medium of claim 17, wherein each level of the plurality of levels before the final level comprises sublevels, wherein each sublevel is a decision point for moving to a next level of the plurality of levels.

* * * * *